Patented May 16, 1944

2,348,883

UNITED STATES PATENT OFFICE 2,348,883

ZINC OXIDE

Howard M. Cyr, Palmerton, Pa., assignor to The New Jersey Zinc Company, New York, N. Y., a corporation of New Jersey No Drawing. Application June 3, 1940, Serial No. 338,581

7 Claims. (Cl. 106—296)

The invention relates to zinc oxide and particularly to zinc oxide employed as a rubber compounding agent. The invention aims to improve the dispersability of zinc oxide in rubber and provides improvements in the treatment of zinc oxide prior to its incorporation in rubber and an improved rubber compounding agent.

Zinc oxide is a known ingredient in rubber compounds and is known to impart superior properties thereto when properly incorporated. However, the zinc oxide must be adequately dispersed in rubber and such dispersion is difficult to obtain even with elaborate mixing mechanisms, especially when the zinc oxide is very finely-divided.

As a result of my investigations, I have discovered that zinc oxide may be incorporated more readily in rubber and tends to disperse more readily therein if the zinc oxide, prior to its incorporation, into the rubber is treated with acetic acid under such conditions that zinc acetate is formed on the surfaces of the particles of zinc oxide. Thus, I have discovered that a rubber compounding agent with superior characteristics is produced by applying to finely-divided zinc oxide a relatively small proportion of acetic acid (say .1% to .6% of acetic acid on the weight of the zinc oxide) under conditions such that zinc acetate is formed on the surface of the particles. The resulting rubber compounding agent (comprising zinc oxide particles surface-coated with zinc acetate in proportions equivalent to, say, 0.1% to 0.6% of acetic acid on the weight of the zinc oxide) may be dispersed readily and thoroughly into rubber with consequent improvement of the character of the resulting rubber compound.

The amount of acetic acid required to coat the zinc oxide particles is, generally speaking, directly proportional to the total surface area of the particles; consequently, the finer the zinc oxide, the more acetic acid is required. However, as indicated above, treatment with from .1% to .6% of acetic acid on the weight of the zinc oxide is adequate with any ordinary type of finely-divided zinc oxide and results in a rubber compounding agent in which most of the particles are surface-coated with zinc acetate.

In the case of ordinary American process zinc oxide with particles of an average particle size of .25 to .35 micron, optimum results of the practice of the invention are obtained by employing about .2% to about .3% acetic acid on the weight of the zinc oxide. In general, treatment of zinc oxide with less than 0.1% acetic acid produces only a relatively minor improvement in the dispersion in rubber. Dispersion generally reaches a well-defined optimum when the invention is practiced employing .3% acetic acid on the weight of the zinc oxide. Above about 0.6% of acetic acid, there is ordinarily a lowering in dispersing effect.

I have found that the present invention is of particular utility in the treatment of zinc oxide of extremely fine particle size, say with an average particle size of .15 to .2 micron. Such zinc oxide in its uncoated state is particularly difficult to disperse in rubber. But if such zinc oxide is treated with acetic acid so that most of its particles are coated with zinc acetate, the dispersability of the product in rubber is greatly improved and at the same time the cure of the resulting rubber compound is retarded.

The acetic acid employed preferably is of high purity. It may be applied to the zinc oxide in the form of glacial acetic acid (in which case the temperature of application must be sufficiently high to melt the acid) or it may be applied in the form of a solution in a solvent that is easy to remove by evaporation and does not produce aggregation of the zinc oxide. Ethyl alcohol is an appropriate solvent, for it boils at a temperature well below the boiling point of acetic acid. Water may be employed as a solvent for the acetic acid if care is taken to limit the amount of water present so as to avoid agglomerating the oxide.

In accordance with my invention, the acetic acid is brought into contact with the zinc oxide under conditions such that the acetic acid has a substantial vapor pressure, and preferably is applied in a dispersed state, i. e. as a fine spray or mist or vapor.

When the acetic acid is employed as a solution in a solvent, temperature conditions should be such as to permit the evaporation of the solvent. When employing ethyl alcohol solutions of acetic acid in the practice of the invention, the treatment may be carried out at room temperature. However, the preferred temperature of application is in the neighborhood of or slightly above the boiling point of acetic acid, say about 118° C. For optimum results, the zinc oxide should be at such a temperature when it is brought into contact with the acetic acid. Thus, the zinc oxide may be heated to a temperature of the order of 118° C. or somewhat higher prior to bringing it into contact with the acetic acid. Such procedure assures the complete vaporization of the acetic acid at the point where it is to react with the zinc oxide, thus favoring prompt and uniform reaction of the two to form an adequate coating of zinc acetate. If a solution of acetic acid in a lower-boiling solvent (such as ethyl alcohol) is employed, such procedure also insures the evaporation of the solvent.

In order to secure good results in the practice of my invention, vigorous and thorough agitation is required to bring the particles of zinc oxide into intimate contact with the acetic acid. The treatment of the zinc oxide with the acetic acid may be carried out in a variety of mixing apparatus. A suitable apparatus is a dry mixer or blender of customary type. Such a blender is a trough equipped with a stirring mechanism for vigorously agitating the zinc oxide, and provided with means for heating the oxide, such as a jacket on the sides of the trough through which steam or other hot gasses may be passed. Preferably, the blender is closed by a cover or other means to prevent the escape of the acetic acid and of vapors of any solvent, such as ethyl alcohol, used with the acetic acid. The closed trough comprises a mixer chamber and an inlet into this mixer chamber is provided for supplying acetic acid or a solution thereof in an appropriate solvent.

As indicated hereinbefore, the zinc oxide preferably is preheated prior to contact with the acetic acid. In the apparatus described above, the zinc oxide is preheated by means of the heating jacket. Thereafter the acetic acid is introduced into the mixing chamber in the form of vapor mixed with air or with an inert gas, such as nitrogen, or in the form of a liquid spray. The stirring mechanism is operated during the preheating and while the acetic acid is introduced and for so long thereafter as is necessary to assure adequate mixing of the acid and the oxide. The duration of the treatment depends upon the temperature, the rate of agitation of the oxide, the quantity of oxide to be furnished and the rate at which the acetic acid vapor or spray is furnished. In any case, the agitation should be vigorous.

As indicated above, it is desirable to carry out the mixing of the acetic acid and the zinc oxide at a temperature in the neighborhood and preferably slightly above the boiling point of the acetic acid. However, a solution of acetic acid in an appropriate solvent, such as ethyl alcohol, may be sprayed into the oxide at room temperature, if such spraying is followed by long and vigorous mixing or disintegration of the resulting mixture to assure thorough dispersion of the acetic acid on the oxide particles and by sufficient ventilation or heating to remove the solvent by evaporation.

Some zinc oxide, particularly American process zinc oxide, has a relatively high degree of acidity when fresh. Thus, zinc oxide (due to retention of acid compounds of sulfur derived from sulfur present in the charge from which the zinc oxide is prepared) may have an acidity in excess of 0.2%, caluculated as per cent $SO_3$ on the weight of the zinc oxide and determined by titration with sodium hydroxide with a water slurry of the oxide with phenolphthalein as indicator. I have discovered that an improved result is obtained in rubber compounding if the zinc oxide of my rubber compounding agent has an acidity below about .2%. Requisite reduction of acidity of the zinc oxide prior to treatment with acetic acid can be brought about by mere aging at room temperature for about three months, the exact time required being dependent upon prevailing weather conditions, i. e., upon the temperature and degree of humidity to which the zinc oxide is subjected during aging. I have discovered, however, that in conjunction with and preferably prior to the treatment of the zinc oxide with acetic acid in accordance with my invention, it is desirable to subject the zinc oxide to an accelerated aging treatment with steam, such treatment being carried out until the zinc oxide has an acidity below about .2%. Thus, the zinc oxide is treated with steam under conditions such that moisture is adsorbed or condensed on the zinc oxide, this moisture being removed by a drying treatment prior to contact of the zinc oxide with the acetic acid. Suitable reduction in acidity can be obtained by treating the zinc oxide with steam at a temperature of about 90° C. to 110° C., this steam treatment being followed immediately by a heat treatment without steam and at a temperature adequate to remove adsorbed moisture from the zinc oxide (say, 118–130° C.).

The duration of the steam treatment will depend upon the original acidity of the zinc oxide. In the case of oxide of relatively low acidity, say 0.2%, the duration of treatment may be only ten minutes. In the case of oxide of relatively high acidity, say 0.6%, a steam treatment of forty minutes may be required.

Zinc oxide should be vigorously stirred during the entire steam treatment and drying treatment. Such vigorous agitation can be obtained by employing an apparatus such as the dry blender (described hereinbefore) equipped with a mixing device capable of running at a relatively rapid speed, say 60 R. P. M. Such apparatus should be provided with an inlet and an outlet for steam, the inlet being equipped with a valve for shutting off the steam prior to the beginning of the drying treatment. At completion of the drying treatment, the zinc oxide will be hot and the operation preferably is so conducted that at this time the zinc oxide is at or above the boiling point of acetic acid—118° C. With the zinc oxide at such temperature, the acetic acid is admitted to the mixer in the manner already described, vigorous stirring or agitation of the oxide being continued.

The treatment with steam to lower the acidity of the oxide below about .2% may be carried out simultaneously with or after the acetic acid treatment, but my preferred practice is to lower the acidity of the zinc oxide before employing the acetic acid.

Zinc oxide treated with acetic acid in accordance with my invention retards the cure of rubber compounds; the retardation affects not only the initial cure but also the time to optimum cure. The retardation of cure is observed in rubber compounding operations whether these operations involve the use of acid type accelerators or alkaline type accelerators. However, retardation is not so marked in the case of acid type accelerators, such as mercapto derivatives, as it is in the case of accelerators of the alkaline type.

I claim:

1. In the treatment of finely-divided zinc oxide containing a sulphur compound and having an acidity in excess of about 0.2%, calculated as per cent $SO_3$ on the weight of the zinc oxide, the improvement which comprises exposing the zinc oxide to the action of steam until the acidity of the zinc oxide is substantially below 0.2% and to the action of acetic acid in proportions ranging from about 0.1% to about 0.6% on the weight of the zinc oxide to form zinc acetate on the surfaces of the zinc oxide particles.

2. Process according to claim 1 in which the zinc oxide has a temperature in the neighborhood of the boiling point of acetic acid at the time that the acetic acid is applied thereto.

3. Process according to claim 1 in which the acetic acid employed is glacial.

4. Process according to claim 1 in which the acetic acid is applied as a solution in ethyl alcohol.

5. In the treatment of finely-divided zinc oxide containing a sulphur compound and having an acidity in excess of about 0.2%, calculated as per cent $SO_3$ on the weight of the zinc oxide, the improvement which comprises exposing the zinc oxide to the action of steam until the acidity of the zinc oxide is substantially below 0.2% and thereafter contacting the particles of zinc oxide of such acidity with acetic acid to form a substantial proportion of zinc acetate on the surfaces of the particles.

6. Process according to claim 5 in which the zinc oxide has an average particle size ranging from about .25 to about .35 micron, and the acetic acid is applied in proportions ranging from about .2% to about .3% on the weight of the zinc oxide.

7. Process according to claim 5 in which the acetic acid applied is in a dispersed state and has a substantial vapor pressure.

HOWARD M. CYR.